US011772735B2

(12) United States Patent
Shikanai et al.

(10) Patent No.: US 11,772,735 B2
(45) Date of Patent: Oct. 3, 2023

(54) MAIN STEP STRUCTURE FOR SADDLE RIDING VEHICLE

(71) Applicant: HONDA MOTOR CO., LTD., Tokyo (JP)

(72) Inventors: Shimpei Shikanai, Tokyo (JP); Masayuki Hojo, Tokyo (JP); Yoshihito Tokuda, Tokyo (JP); Hiroyuki Sasazawa, Tokyo (JP); Kenichi Misaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 17/474,822

(22) Filed: Sep. 14, 2021

(65) Prior Publication Data
US 2022/0097790 A1 Mar. 31, 2022

(30) Foreign Application Priority Data
Sep. 30, 2020 (JP) .................................. 2020-165294

(51) Int. Cl.
*B62J 25/06* (2020.01)
(52) U.S. Cl.
CPC ..................................... *B62J 25/06* (2020.02)
(58) Field of Classification Search
CPC ..................................................... B62J 25/06
See application file for complete search history.

(56) References Cited

U.S. PATENT DOCUMENTS 7,992,885 B2 * 8/2011 Ishikawa .................. B62J 25/06
280/301

FOREIGN PATENT DOCUMENTS

| JP | 2003-072632 | | 3/2003 | |
| TW | 201341258 A | * | 10/2013 | |
| WO | WO-2021001853 A1 | * | 1/2021 | .............. B62J 25/06 |

* cited by examiner

*Primary Examiner* — Kevin Hurley
*Assistant Examiner* — Hosam Shabara
(74) *Attorney, Agent, or Firm* — Rankin, Hill & Clark LLP

(57) ABSTRACT

The main step structure for the saddle riding vehicle includes a fixing member, a step pin, a main step, and a biasing member that biases the main step in a developing direction. The main step structure includes an operating member supported to be rotatable relative to the main step. The operating member is provided with a contact section that makes contact with the fixing member. An engaging mechanism that can switch between an engaged state and a disengaged state of the main step and the operating member is provided. In the case where the main step is moved to an accommodated position and the operating member is made to make contact with the fixing member, the engaging mechanism puts the main step and the operating member into an engaged state.

7 Claims, 9 Drawing Sheets

MAIN STEP STRUCTURE FOR SADDLE RIDING VEHICLE

INCORPORATION BY REFERENCE

The present application claims priority under 35 U.S.C. § 119 to Japanese Patent Application No. 2020-165294 filed on Sep. 30, 2020. The content of the application is incorporated herein by reference in its entirety.

TECHNICAL FIELD

The present invention relates to a main step structure for a saddle riding vehicle.

BACKGROUND ART

In the past, as a main step structure for a saddle riding vehicle, there has been known a structure in which a main step is rotatably supported, and the main step is biased to a developed state by a return spring (see, for example, Patent Document 1). In Patent Document 1, the main step is put in a developed state to permit the driver to easily put his or her feet thereon at normal times, and, in the case where the main step makes contact with a road or the like at the time of banking of the vehicle body, the main step is rotated against a biasing force of the return spring such that the main step can be retracted from the road.

PRIOR ART DOCUMENT

Patent Document

[Patent Document 1]
Japanese Patent Laid-Open No. 2003-072632

SUMMARY OF THE INVENTION

Problem to be Solved by the Invention

Since the main step projects in the vehicle width direction in the case where the main step is developed, there is a need for holding the main step in an accommodated state from the viewpoint of compactness and from the viewpoint of handleability of the vehicle. Particularly, in a state in which the main step is developed, a stand provided in the vicinity of the main step may be difficult for the driver to operate. It is to be noted, however, that since the main steps are parts on which the driver put his or her feet during traveling, the main steps are desired to be consciously accommodated, without being unconsciously accommodated due to a disturbance.

The present invention has been made in consideration of the foregoing circumstances, and it is an object of the present invention to provide a main step structure for a saddle riding vehicle with which a main step can consciously be accommodated.

Means for Solving the Problem

There is provided a main step structure for a saddle riding vehicle, including a fixing member fixed to a vehicle body, a step pin supported by the fixing member, a main step rotatably supported by the step pin, and a biasing member that biases the main step in a developing direction around an axis of the step pin toward a developed position. An operating member that is rotatably supported by the step pin and is supported such as to be rotatable relative to the main step is provided, the operating member is provided with a contact section that makes contact with the fixing member to restrict the fixing member from rotating in the developing direction, an engaging mechanism that is able to switch between an engaged state and a disengaged state of the main step and the operating member is provided between the main step and the operating member, and, in a state in which the main step is moved to an accommodated position, in a case where the operating member is moved to a rotation restriction position where the contact section makes contact with the fixing member, the engaging mechanism puts the main step and the operating member in an engaged state.

In the above configuration, the engaging mechanism may include an engaging member and an engaging section that engages with and disengages from the engaging member, the engaging member may include an engaging/disengaging member that engages with and disengages from the engaging section, and a biasing section that biases the engaging/disengaging member to the engaging section, and the engaging section may be an engaging groove into which the engaging/disengaging member enters in an engageable and disengageable manner.

In addition, in the above configuration, the main step may include a step main body section, and a step base section that extends from the step main body section and is rotatably supported by the step pin, the step base section may have an overlapping part that overlaps with the operating member as viewed in an axis of the step pin, the engaging member may be disposed at the overlapping part, and the operating member may be provided with the engaging section on a rotational locus of the engaging member.

Besides, in the above configuration, the operating member may be provided with a second engaging section for engagement with and disengagement from the engaging member, on a further downstream side in the developing direction than the engaging section and on a rotational locus of the engaging member, and the second engaging section may be engaged with the engaging member in a state in which the main step is moved to the developed position and the operating member is moved to the rotation restriction position.

In addition, in the above configuration, the operating member may be provided with a second contact section that is provided on a further downstream side in the developing direction than the contact section and makes contact with the fixing member to restrict rotation of the fixing member in an accommodating direction opposite to the developing direction, the operating member is capable of being rotated between the rotation restriction position and a second rotation restriction position where the second contact section makes contact with the fixing member, and the second engaging section may be disengaged from the main step in a case where the main step is moved to the accommodated position in a state in which the operating member is moved to the second rotation restriction position.

Besides, in the above configuration, the operating member may be provided with an extension section extending along a lower surface of the main step.

In addition, in the above configuration, the main step may be disposed between a step floor provided on a front lower side of a seat and a stand provided on a lower side of the seat in vehicle side view.

Effects of the Invention

The main step structure for the saddle riding vehicle is a main step structure for a saddle riding vehicle, including the fixing member fixed to the vehicle body, the step pin supported by the fixing member, the main step rotatably supported by the step pin, and the biasing member that biases the main step in the developing direction around the axis of the step pin toward the developed position. The operating member that is rotatably supported by the step pin and is supported such as to be rotatable relative to the main step is provided, the operating member is provided with the contact section that makes contact with the fixing member to restrict the fixing member from rotating in the developing direction, the engaging mechanism that can switch the engaged state and the disengaged state of the main step and the operating member is provided between the main step and the operating member, and, in the state in which the main step is moved to the accommodated position, in the case where the operating member is moved to the rotation restriction position where the contact section makes contact with the fixing member, the engaging mechanism puts the main step and the operating member in the engaged state. According to this configuration, by operating the operating member to engage the operating member with the main step, the main step biased to the developed position can be held in the accommodated position. Therefore, in the case of holding the main step, an operation of the operating member is needed, and the main step can consciously be held in the accommodated position.

In the above configuration, the engaging mechanism may include the engaging member and the engaging section that engages with and disengages from the engaging member, the engaging member may include an engaging/disengaging member that engages with and disengages from the engaging section, and the biasing section that biases the engaging/disengaging member to the engaging section, and the engaging section may be the engaging groove into which the engaging/disengaging member enters in an engageable and disengageable manner. According to this configuration, the main step and the operating member can be engaged with and disengaged from each other according to a rotating operation of the operating member, with a simple configuration.

In addition, in the above configuration, the main step may include the step main body section, and the step base section that extends from the step main body section and is rotatably supported by the step pin, the step base section may have the overlapping part that overlaps with the operating member as viewed in the axis of the step pin, the engaging member may be disposed at the overlapping part, and the operating member may be provided with the engaging section on the rotational locus of the engaging member. According to this configuration, the engaging member is securely abutted on the operating member at the time of relative rotation of the main step and the operating member, and, therefore, the engaging member and the engaging section can easily be engaged with and disengaged from each other.

Besides, in the above configuration, the operating member may be provided with the second engaging section for engagement with and disengagement from the engaging member, on the further downstream side in the developing direction than the engaging section and on the rotational locus of the engaging member, and the second engaging section may be engaged with the engaging member in a state in which the main step is moved to the developed position and the operating member is moved to the rotation restriction position. According to this configuration, the main step and the operating member can be put into the engaged state when the main step is moved to the developed position. In addition, since the main step having moved to the developed position is engaged with the operating member, in the case of moving the main step from the developed position toward the accommodated position, the operating member can also be rotated integrally with the main step.

In addition, in the above configuration, the operating member may be provided with the second contact section that is provided on the further downstream side in the developing direction than the contact section and makes contact with the fixing member to restrict rotation of the fixing member in the accommodating direction opposite to the developing direction, the operating member can be rotated between the rotation restriction position and the second rotation restriction position where the second contact section makes contact with the fixing member, and the second engaging section may be disengaged from the main step in the case where the main step is moved to the accommodated position in the state in which the operating member is moved to the second rotation restriction position. According to this configuration, in the case where the operating member is moved to the second rotation restriction position in a state in which the main step and the operating member are engaged with each other, the engagement between the operating member and the main step can be released by moving the main step further in the accommodating direction. Therefore, the engagement between the operating member and the main step can be released by a simple operation of rotating the main step from the developed position to the accommodated position.

Besides, in the above configuration, the operating member may be provided with the extension section extending along the lower surface of the main step. According to this configuration, in the case where the main step is engaged with the operating member at the developed position, the extension section extends along the main step, and, in the case where the engagement is released in the course of movement of the main step from the developed position to the accommodated position, the spacing between the extension section and the main step is enlarged, and, therefore, it is easy to operate the extension section and to operate the operating member.

In addition, in the above configuration, the main step may be disposed between the step floor provided on the front lower side of the seat and the stand provided on the lower side of the seat in vehicle side view. According to this configuration, it can be made easy to operate the stand, by holding the main step in the accommodated position. In addition, the driver can put his or her feet on the step floors even if the main steps are held in the accommodated positions.

MODE FOR CARRYING OUT THE INVENTION

Figure 1:
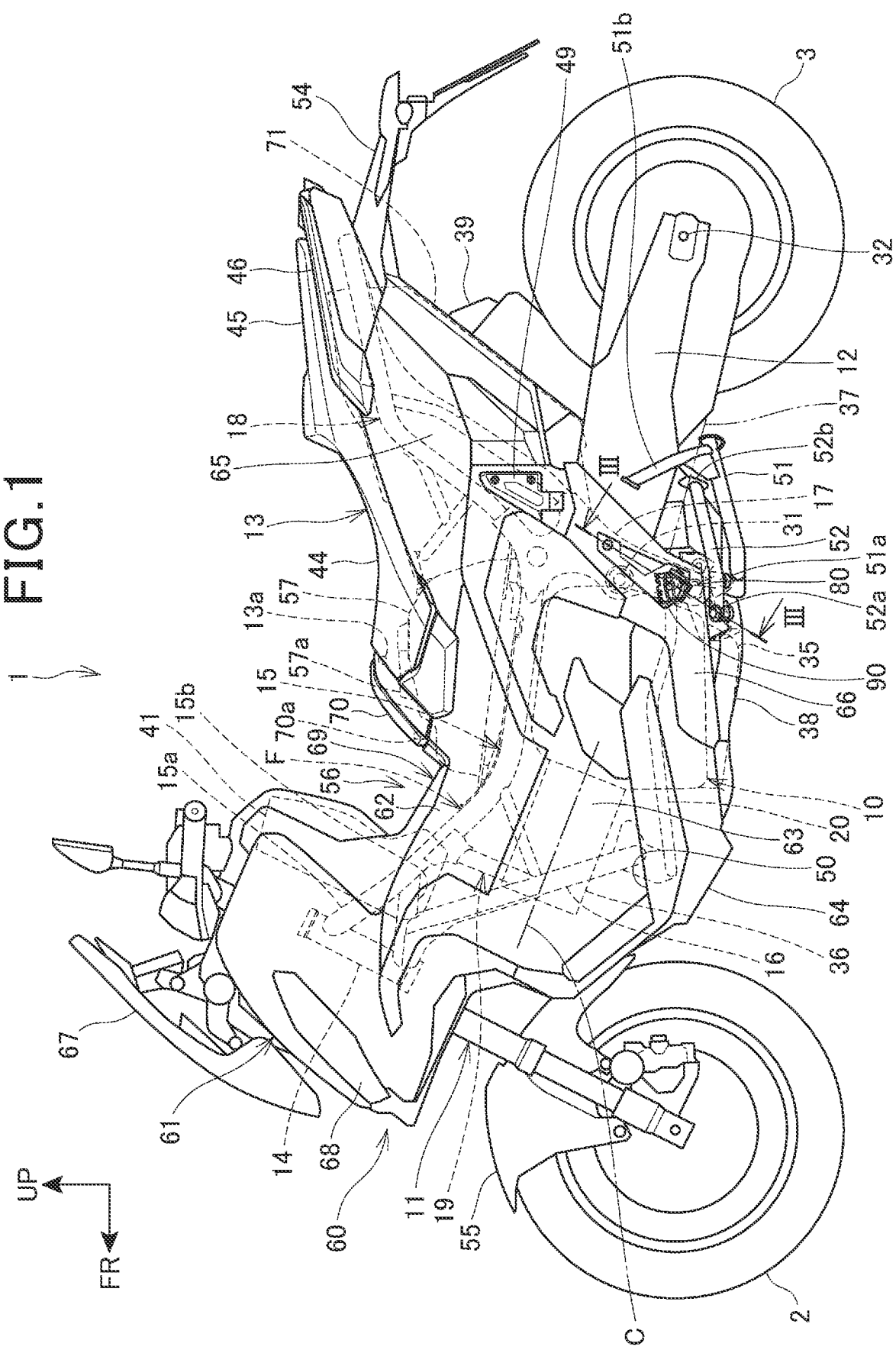
FIG. 1 is a left side view of a two-wheeled motor vehicle according to an embodiment of the present invention.

An embodiment of the present invention will be described below referring to the drawings. Note that, in the description, the directions such as forward and rearward directions, left and right directions, and upward and downward directions are the same as those with respect to the vehicle body, unless otherwise specified. In addition, symbol FR in each drawing indicates the front side of the vehicle, symbol UP indicates the upper side of the vehicle, and symbol LH indicates the left side of the vehicle.

FIG. 1 is a left side view of a two-wheeled motor vehicle 1 according to an embodiment of the present invention. Note that, in a side view in the following description, of parts provided in a left-right pair, only the one on one side is illustrated.

The two-wheeled motor vehicle 1 is a vehicle in which an engine 10 as a power unit is supported on a body frame (frame) F, a steering system 11 steerably supporting a front wheel 2 is steerably supported on a front end of the body frame F, and a swing arm 12 supporting a rear wheel 3 is provided on a rear part side of the body frame F. The two-wheeled motor vehicle 1 is a saddle riding vehicle in which a rider seat 13 for having a rider seated in a straddling manner is provided on an upper side of a rear part of the body frame F.

Figure 2:
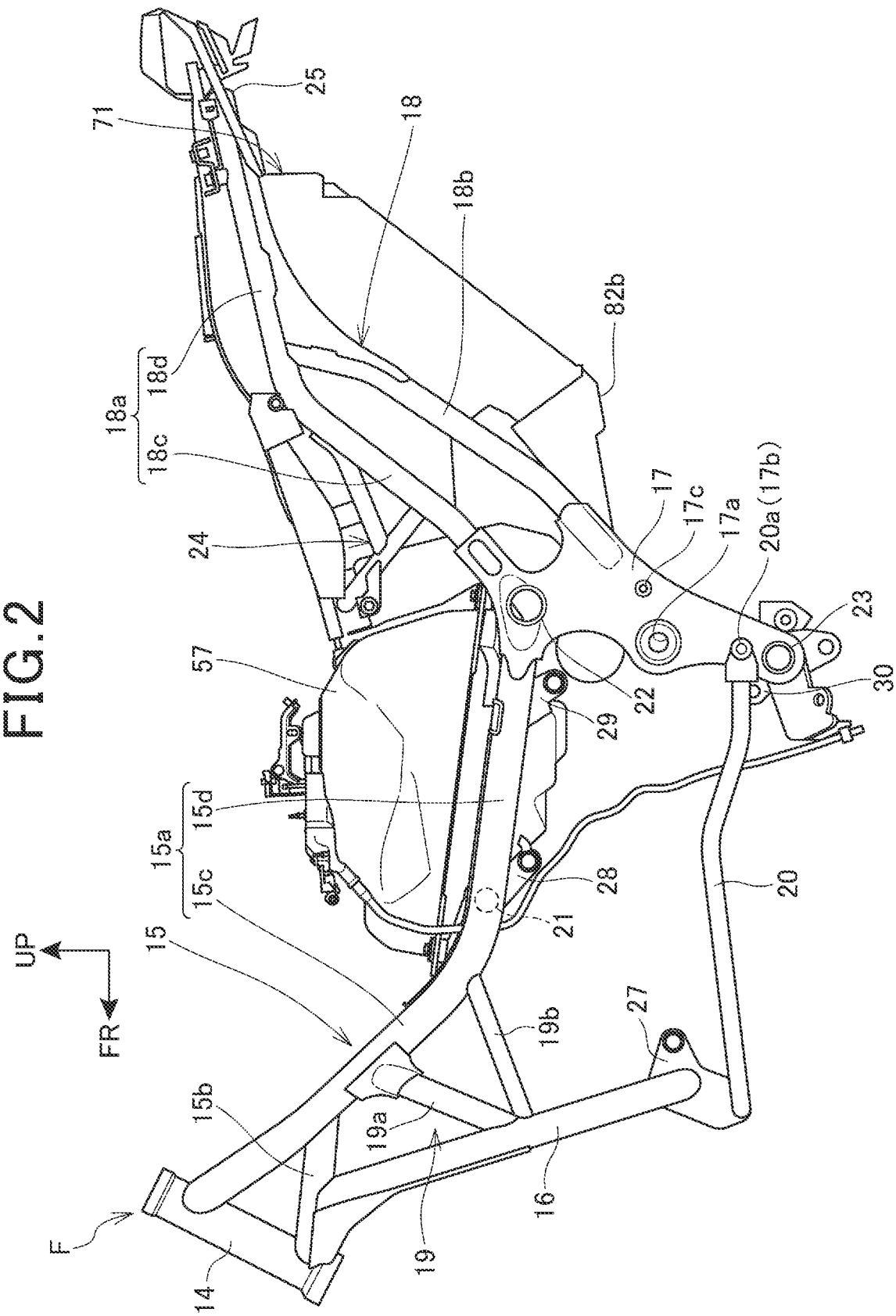
FIG. 2 is a left side view depicting a body frame, a fuel tank supported by the body frame, and an accommodating section.

FIG. 2 is a left side view depicting the body frame F, a fuel tank 57 supported by the body frame F, and an accommodating section 71.

The body frame F includes a head pipe 14 provided at a front end, a pair of left and right main frames 15 extending rearwardly downward from a rear portion of the head pipe 14, and a pair of left and right down frames 16 extending rearwardly downward from front end portions of the main frames 15. In addition, the body frame F includes a pair of left and right pivot frames 17 extending downward from rear ends of the main frames 15, and a pair of left and right seat frames 18 extending rearwardly upward from upper portions of the pivot frames 17 to vehicle rear end portions. Further, the body frame F includes a pair of left and right connection frames 19 that connect the main frames 15 and the down frames 16, and a pair of left and right step frames 20 that connect lower ends of the down frames 16 and lower ends of the pivot frames 17.

The main frames 15 include main frame main body sections 15a extending rearwardly downward from an upper portion of the head pipe 14, and reinforcement frame sections 15b that connect a lower portion of the head pipe 14 and front portions of the main frame main body sections 15a.

The main frame main body sections 15a include main body section front parts 15c extending rearwardly downward from an upper portion of the head pipe 14, and main body section rear parts 15d extending rearwardly downward from rear ends of the main body section front parts 15c with an inclination gentler than that of the main body section front parts 15c. The main body section front parts 15c extend such that the spacing thereof in the vehicle width direction is larger on the rear side in plan view. In addition, the main body section rear parts 15d extend rectilinearly and substantially in parallel in plan view.

The reinforcement frame sections 15b extend rearwardly downward with an inclination gentler than that of the main body section front parts 15c, and the spacing thereof in the vehicle width direction is larger on the rear side.

The connection frames 19 include a pair of left and right first connection frames 19a which connect vertical directionally intermediate parts of the main body section front parts 15c of the main frames 15 and vertical directionally intermediate parts of the down frames 16, and a pair of left and right second connection frames 19b that connect rear end portions of the main body section front parts 15c and vertical directionally intermediate parts of the down frames 16.

The step frames 20 are substantially U-shaped projecting toward the vehicle width directionally outer sides in plan view. The step frames 20 project from lower ends of the down frames 16 toward the vehicle width directionally outer sides, are thereafter bent to the rear side to extend rectilinearly, are inclined at rear portions such as to be located on the vehicle width directionally inner sides in going rearward, and are connected to lower ends of the pivot frames 17.

The pivot frames 17 are provided with pivot holes 17a (see FIG. 2) in their vertically intermediate parts, and a pivot shaft 31 (see FIG. 1) connecting the left and right pivot frames 17 in the vehicle width direction is inserted in and passed through the pivot holes 17a.

The seat frames 18 include seat frame main body sections 18a extending rearwardly upward from upper portions of the pivot frames 17, and sub-frame sections 18b that connect vertical directionally intermediate parts of the pivot frames 17 and the seat frame main body sections 18a.

The seat frame main body sections 18a include rising sections 18c extending rearwardly upward from upper portions of the pivot frames 17, and rear extending sections 18d extending rectilinearly rearward from upper ends of the rising sections 18c. The rear extending sections 18d extend rearwardly upward with an inclination gentler than that of the rising sections 18c.

The body frame F includes cross frames such as a front-side cross frame 21 that connects front portions of the main body section rear parts 15d of the main frames 15 in the vehicle width direction, an intermediate-side cross frame 22 that connects upper end parts of the pivot frames 17 in the vehicle width direction, a lower-side cross frame 23 that connects lower end parts of the pivot frames 17 in the vehicle width direction, a rear-side cross frame 24 that connects front parts of the seat frame main body sections 18a in the vehicle width direction, and a rear end side cross frame 25 that connects rear end parts of the seat frame main body sections 18a in the vehicle width direction.

As depicted in FIG. 2, the body frame F includes a front-side engine hanger 27 at lower end parts of the down frames 16, an upper-side engine hanger 28 at the front-side cross frame 21, a rear-side engine hanger 29 at rear end parts of the main frame main body sections 15a, and a lower-side engine hanger 30 at the lower-side cross frame 23.

The engine 10 (see FIG. 1) is supported by the body frame F through the front-side engine hanger 27, the upper-side engine hanger 28, the rear-side engine hanger 29, and the lower-side engine hanger 30.

As illustrated in FIG. 1, the swing arm 12 has a front end part shaft-supported by the pivot shaft 31, and is swung up and down with the pivot shaft 31 as a center. The rear wheel 3 is shaft-supported by a rear wheel axle 32 inserted in and passed through a rear end part of the swing arm 12.

The engine 10 includes a crankcase 35 that supports a crankshaft (not illustrated) extending in the vehicle width direction, and a cylinder section 36 extending forwardly upward from a front part of the crankcase 35. The crankcase 35 is located on lower sides of the main body section rear parts 15d of the main frames 15. The cylinder section 36 extends forwardly upward along the main frames 15, and its front portion is located between the left and right down frames 16 and between the left and right connection frames 19. A transmission is accommodated in a rear part of the crankcase 35.

The engine 10 is an engine inclined forward such that the cylinder axis C of the cylinder section 36 is closer to a horizontal side than to the vertical, and a space is secured on an upper side of the engine 10.

Output power of the engine 10 is transmitted to the rear wheel 3 by a chain 37 wrapped around an output shaft (not illustrated) of the engine 10 and the rear wheel 3.

An exhaust pipe 38 of the engine 10 is led out to a lower side from a cylinder head of the cylinder section 36, extends rearward through the lower side of the engine 10, and is connected to a muffler 39 on a right side of the swing arm 12.

A clarifier 41 that clarifies intake air (outside air) supplied to the engine 10 is disposed on a rear side of the head pipe 14 on an upper side of front parts of the main frames 15.

The seat 13 integrally includes a front-side seat 44 for the driver (rider) and a rear-side seat 45 for a passenger that is one step higher than the front-side seat 44. The seat 13 is provided to be rotatable vertically through a hinge shaft 13a at a front end portion.

The front-side seat 44 is located on upper sides of the pivot frames 17. In addition, the front-side seat 44 is located on an upper side of a rear portion of the crankcase 35.

The rear-side seat 45 is located on an upper side of rear portions of the seat frames 18. Grip sections 46 to be gripped by the passenger seated on the rear-side seat 45 are individually provided on the left and right sides of the rear-side seat 45.

A pair of left and right passenger steps 49 are supported by the seat frames 18. A pair of left and right step floors 50 for the driver are provided on a front lower side of the front-side seat 44. The step floors 50 are located on upper sides of the step frames 20. The step floors 50 extend in a vehicle longitudinal direction along the upper sides of the step frames 20. The step floors 50 extend to a front side relative to the pivot frames 17, and extend to a lower side of the fuel tank 57. A pair of left and right main step structures 80 are disposed on rear sides of the step floors 50. The main step structures 80 are supported by the pivot frames 17. The driver can drive in a standing posture by putting his or her feet on main steps 90 of the main step structures 80.

A main stand 51 is connected to lower parts of the pivot frames 17. A shaft 51a of the main stand 51 is located on a lower side of the main steps 90. An operating section 51b of the main stand 51 extends above the main steps 90 when the main steps 90 are accommodated. A side stand 52 is provided at a left end portion of a lower part of the body frame F. A shaft 52a of the side stand 52 is located on a front lower side relative to the main step 90 on the left side. The side stand 52 extends to a rear side relative to the main step 90 when the main step 90 is accommodated, and an end part 52b is located on a substantially horizontal directionally rear side of the shaft 52a.

The fuel tank 57 is disposed on upper sides of the main body section rear parts 15d of the main frames 15. A rear portion of the fuel tank 57 is located on a lower side of the front-side seat 44 of the seat 13. The fuel tank 57 includes an oil feed port 57a at an upper surface of a front portion thereof. The oil feed port 57a is covered such as to be openable and closable by an oil feed port lid 70. The oil feed port lid 70 is supported rotatably to the front and rear sides through a hinge shaft 70a at a front lower portion thereof. An accommodating section 71 is provided on a rear side of the fuel tank 57. The accommodating section 71 is disposed on a lower side of the seat 13. The accommodating section 71 is openably closed with the seat 13.

As depicted in FIG. 1, the two-wheeled motor vehicle 1 includes a body cover 60 covering the vehicle body. The body cover 60 includes a front cover 61 that covers upper parts of the head pipe 14 and the steering system 11 from front and rear sides and left and right sides, an upper cover 62 that covers the main frames 15 from upper side and left and right side on a rear side of a lower part of the front cover 61, and a pair of left and right intermediate side surface covers 63 that cover the engine 10 and a rear part of the body frame F from lateral sides on a lower side of the upper cover 62. In addition, the body cover 60 includes an under cover that covers the engine 10 from a lower side, a pair of left and right rear covers 65 that cover the lower side of the seat 13 from lateral sides on a rear side of the upper cover 62, and a pair of left and right frame covers 66 that cover a lower portion of a rear part of the engine 10 and lower portions of the pivot frames 17 from lateral sides.

The front cover 61 is provided with a plate-shaped windscreen 67 extending vertically. A headlight 68 is provided on the front cover 61.

In addition, the two-wheeled motor vehicle 1 includes a rear fender 54 that covers the rear wheel 3 from an upper side, and a front fender 55 that covers the front wheel 2 from an upper side.

A front part of the upper cover 62 and front parts of the intermediate side surface covers 63 are mated vertically to form a tunnel-shaped center tunnel section 69 which is reverse U-shaped in section. A front part of the body frame F and the cylinder section 36 are accommodated in the inside of the center tunnel section 69.

An upper surface of the center tunnel section 69 is disposed at a lower position than the oil feed port lid 70, whereby a downwardly hollowed straddling section 56 is formed between the front cover 61 and the oil feed port lid 70. The driver to be seated on the front-side seat 44 can pass his or her leg through the straddling section 56, and can easily ride on or get off the two-wheeled motor vehicle 1 at the time of riding on or getting off the two-wheeled motor vehicle 1.

Figure 3:
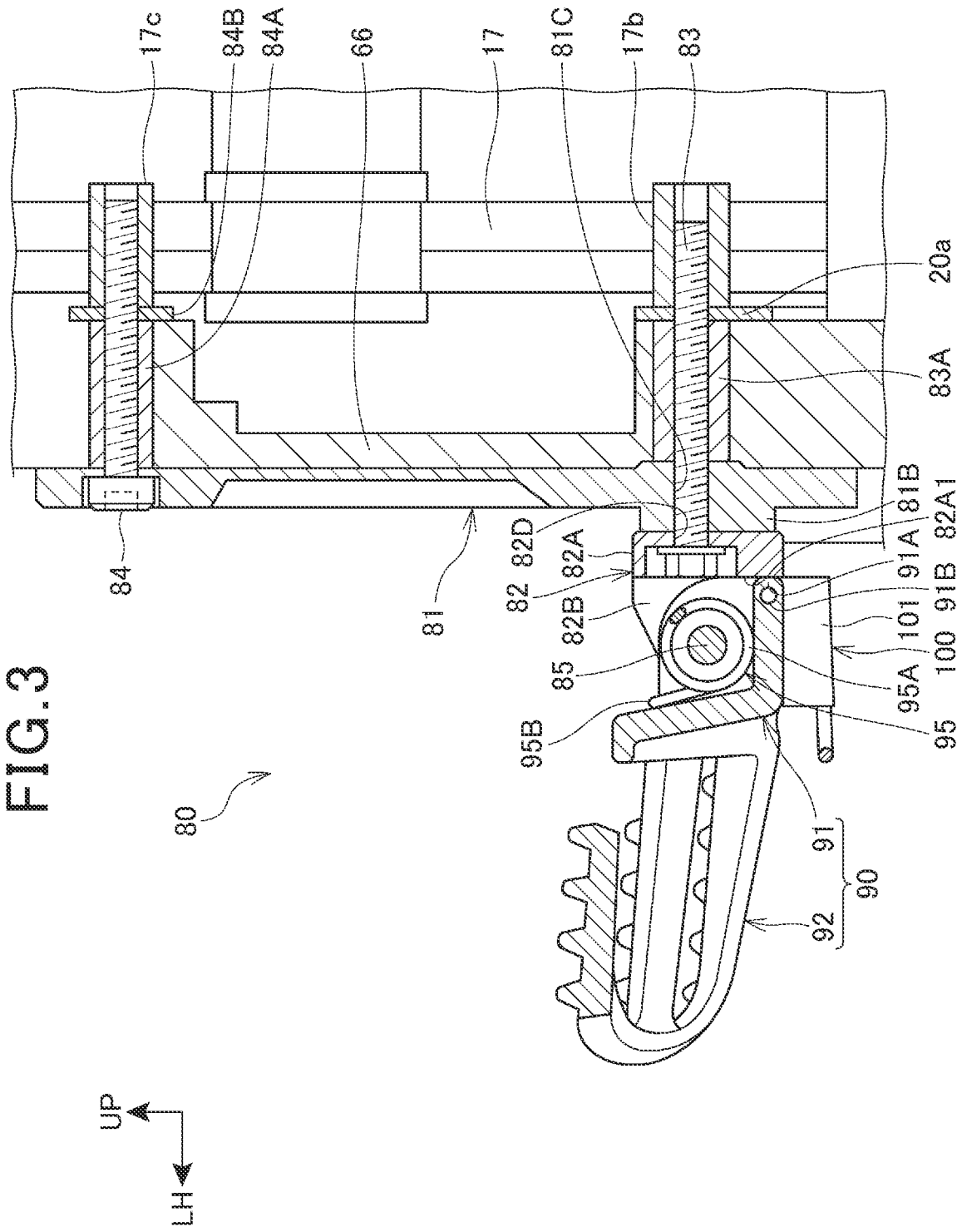
FIG. 3 is a sectional view taken along line III-III of FIG. 1.
Figure 4:
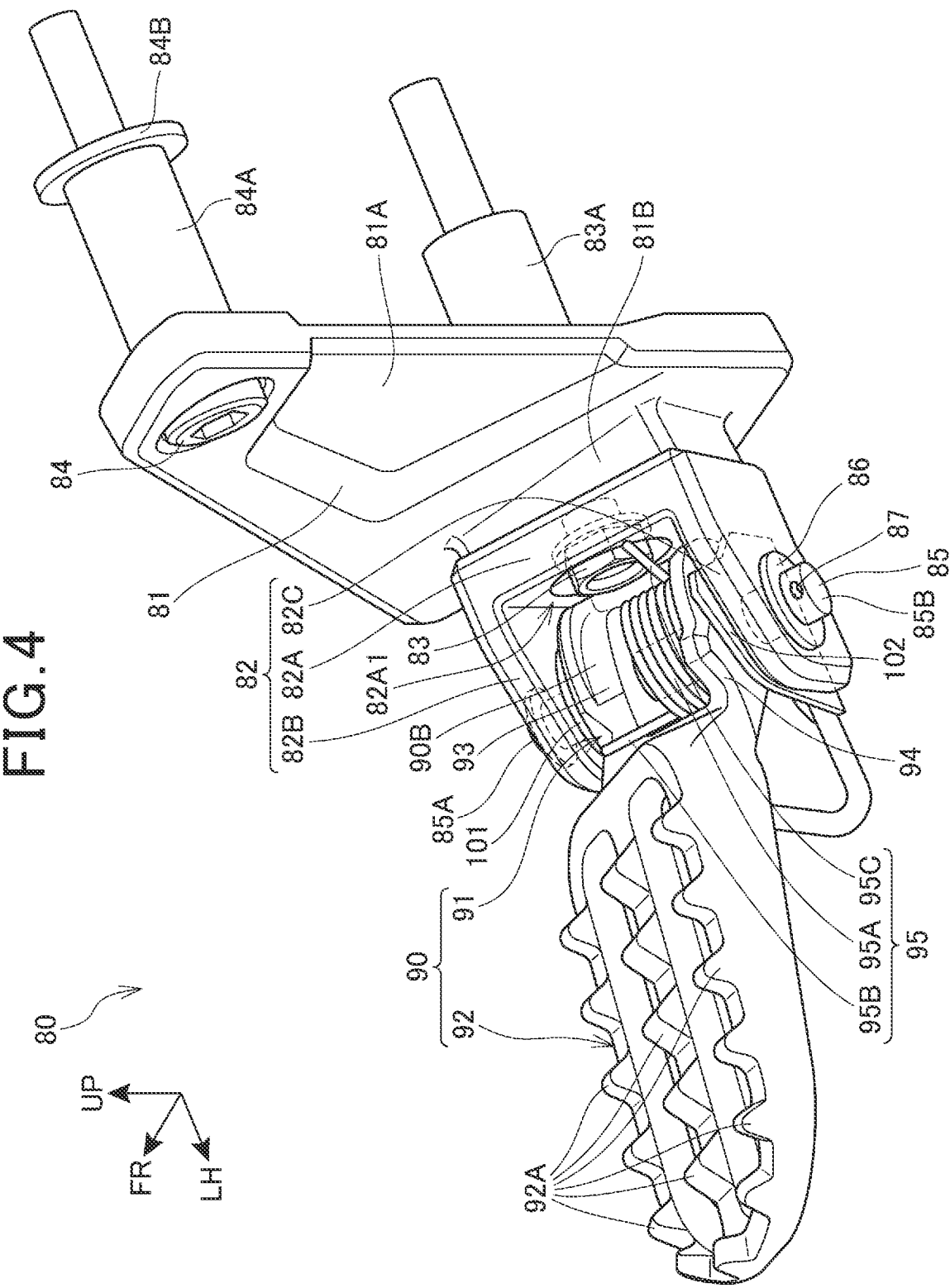
FIG. 4 is a perspective view of a main step structure on the left side.

FIG. 3 is a sectional view taken along line III-III of FIG. 1. FIG. 4 is a perspective view of the main step structure 80 on the left side.

Since the main step structure 80 on the left side and the main step structure 80 on the right side are in left-right symmetry, the main step structure 80 on the left side will be described below.

The main step structure 80 is disposed on a lower side of the seat 13. The main step structure 80 includes a step holder 81. The step holder 81 is formed in the shape of a triangular plate having a base on the front side in vehicle side view. A rear part of the step holder 81 is formed with a recess 81A recessed to a vehicle width directionally inner side.

A lower part of the step holder 81 is formed with a pedestal section 81B projecting to a vehicle width directionally outer side. A bracket (fixing member) 82 is fixed to the pedestal section 81B. The bracket 82 is formed in a U shape opened on a vehicle width directionally outer side in substantially top plan view. Specifically, the bracket 82 includes a bottom plate section 82A extending in the vehicle longitudinal direction, and support plate sections 82B and 82C projecting from both front and rear ends of the bottom plate section 82A to vehicle width directionally outer sides. The bottom plate section 82A is formed with a fixing hole 82D (see FIG. 3) penetrating in the vehicle width direction.

A flanged bolt 83 as an example of a fastening member is inserted in and passed through the fixing hole 82D. The flanged bolt 83 extends in the vehicle width direction, and is fastened to the body frame F through a fixing hole 81C (see FIG. 3) of the step holder 81. In other words, the flanged bolt 83 is fastened to a rear end portion 20a (see FIG. 2) of the step frame 20 of the body frame F and a fastening section 17b of the pivot frame 17. The step holder 81 and the bracket 82 are co-fastened to the body frame F by the flanged bolt 83. Note that, while a lower part of the step holder 81 is fixed by the flanged bolt 83, an upper part of the step holder 81 is fixed to the body frame F by a socket bolt 84 as an example of a fastening member.

The flanged bolt 83 and the socket bolt 84 are fastened to the body frame F through collars 83A and 84A and a washer 84B.

The front and rear support plate sections 82B and 82C of the bracket 82 are individually formed with support holes penetrating in the thickness direction, and a rod-shaped step pin 85 extending in the vehicle longitudinal direction is inserted in and passed through the support holes. The step pin 85 is enlarged in diameter at a front end (one end) 85A thereof, and is inserted in and passed through the support holes starting from a rear end (the other end) 85B thereof, and the step pin 85 is in the state of being bridgingly arranged between the support plate sections 82B and 82C. A split pin (retainer member) 87 is supported on the rear end 85B of the step pin 85, and the step pin 85 is retained on the bracket 82 by the split pin 97 and the enlarged diameter front end 85A.

The main step (step arm) 90 is rotatably supported by the step pin 85.

The main step 90 includes a step base section 91 rotatably supported by the step pin 85, and a step main body section 92 extending to a width directionally outer side from the step base section 91.

The step base section 91 includes a front-side base section (first base section) 93 and a rear-side base section (second base section, overlapping part) 94 which are disposed with a spacing therebetween in the vehicle longitudinal direction (the axial direction of the step pin 85).

A slip resistance 92A in the form of a plurality of teeth is formed on an upper surface of the step main body section 92.

Figure 5:
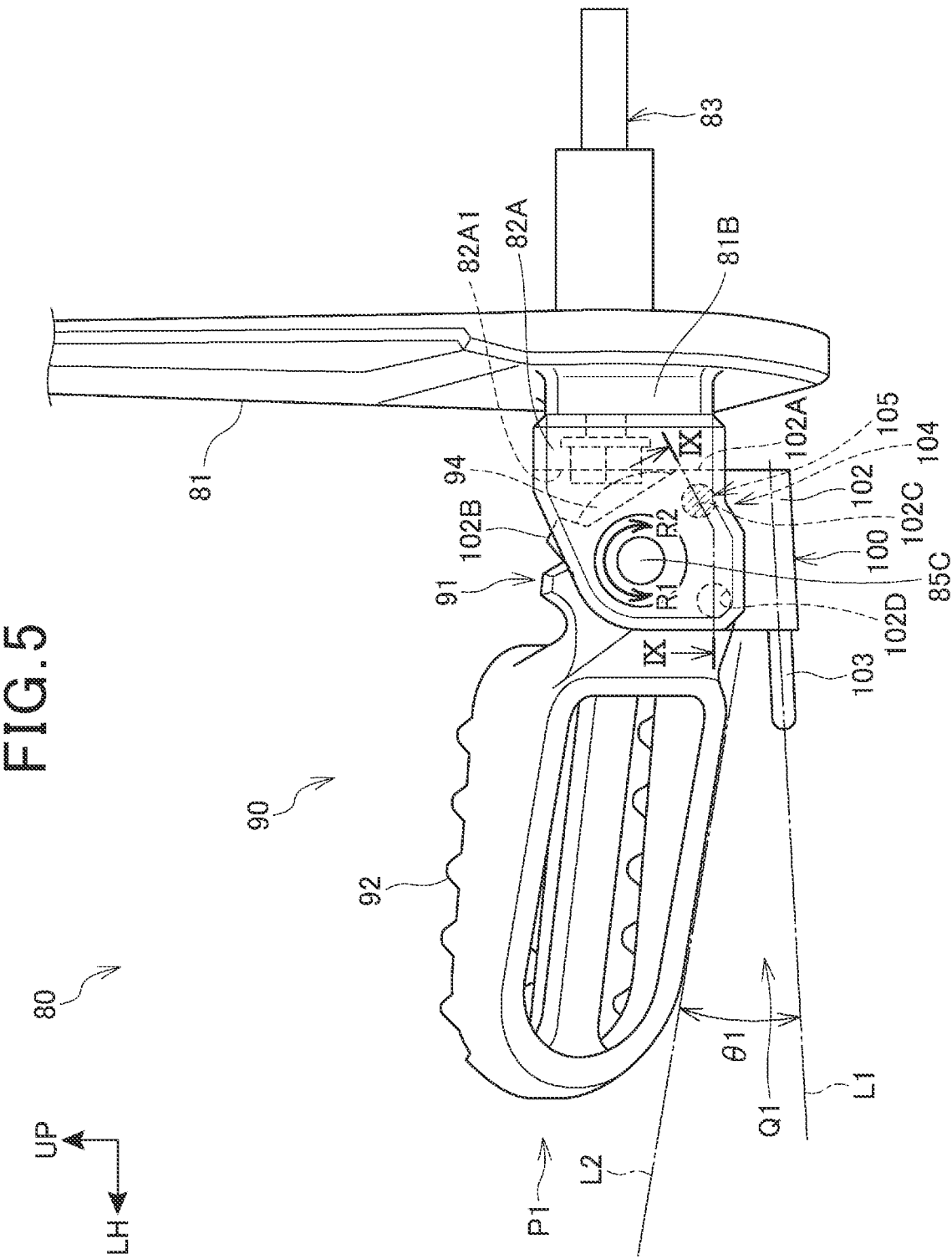
FIG. 5 is a diagram depicting a state in which a main step is moved to a developed position and a first contact section of a click lever makes contact with a bracket.

FIG. 5 is a diagram depicting a state in which the main step 90 is moved to a developed position P1 and the first contact section 102A of the click lever 100 makes contact with the bracket 82 (FIG. 5 depicts a step developed state. In the step developed state, the main step 90 is not fixed, and the main step 90 is in the state of being rotatable in an accommodating direction R2.).

Figure 6:
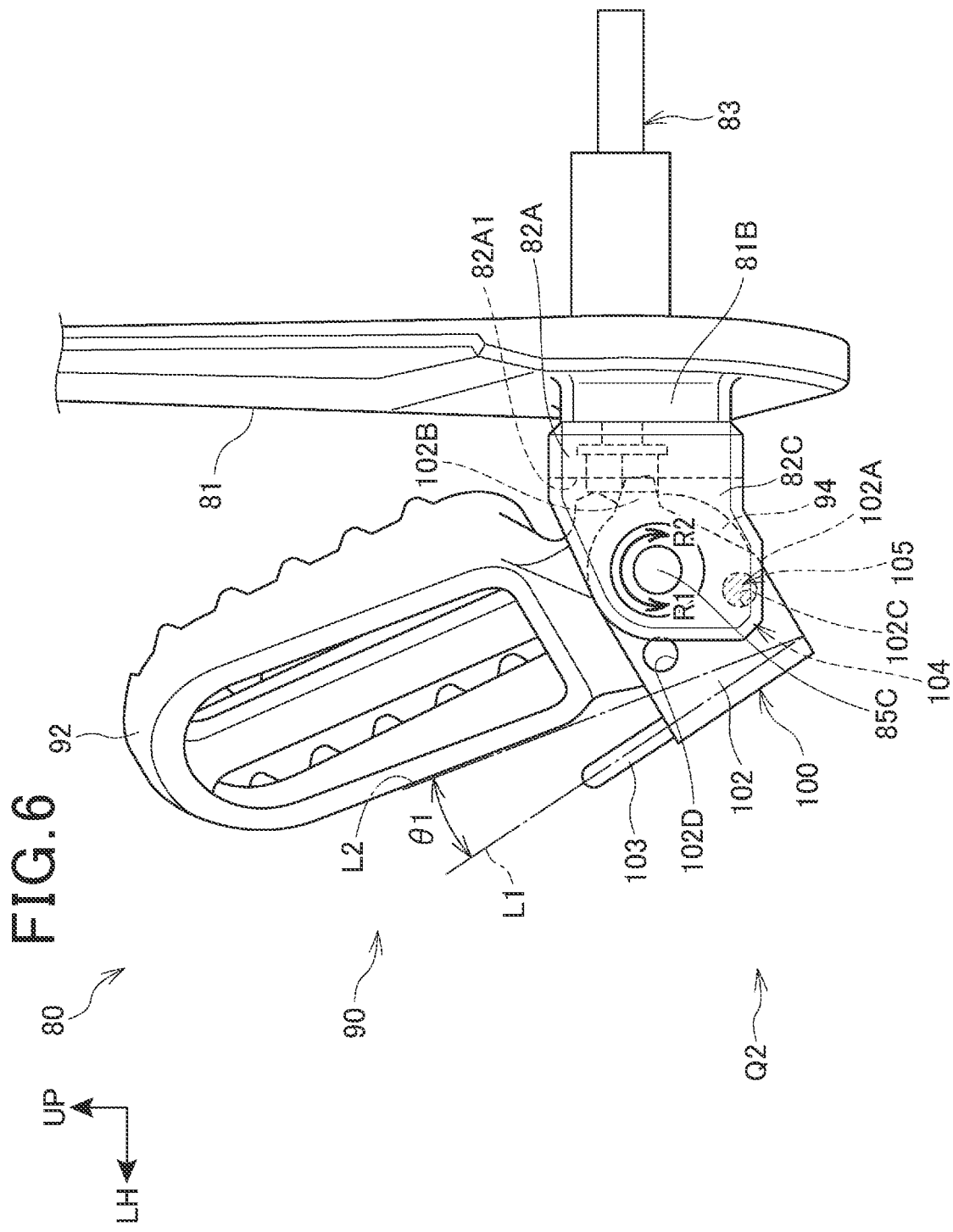
FIG. 6 is a diagram depicting a state in which the main step and the click lever in the state of FIG. 5 are rotated in an accommodating direction and a second contact section of the click lever makes contact with the bracket.

FIG. 6 is a diagram depicting a state in which the main step 90 and the click lever 100 in the state of FIG. 5 are rotated in the accommodating direction R2 and the second contact section 102B of the click lever 100 makes contact with the bracket 82.

Figure 7:
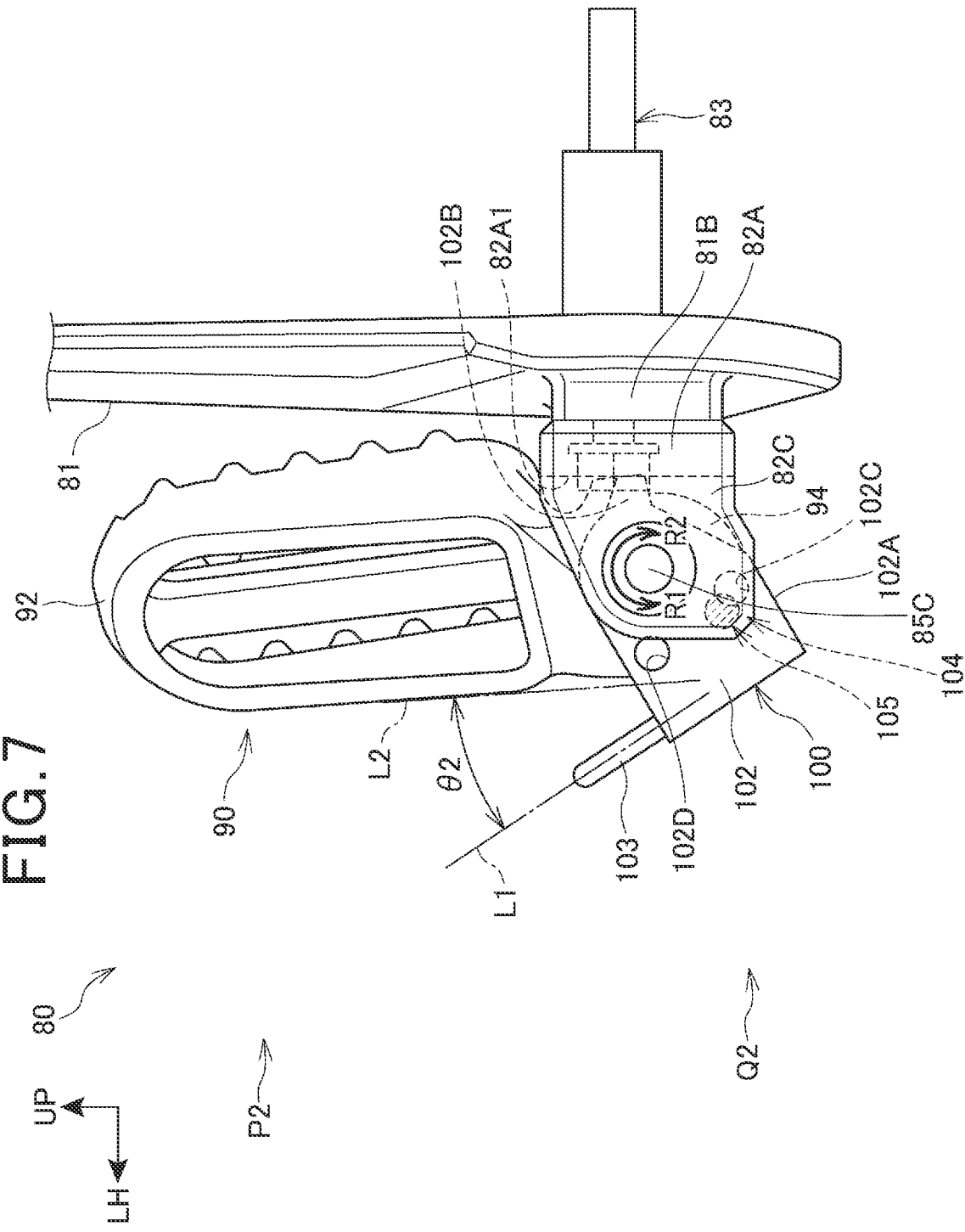
FIG. 7 is a diagram depicting a state in which the main step is rotated further in the accommodating direction from the state of FIG. 6, and the main step is moved to an accommodated position.

FIG. 7 is a diagram depicting a state in which the main step 90 is rotated further in the accommodating direction R2 from the state of FIG. 6 and the main step 90 is moved to the accommodated position P2.

Figure 8:
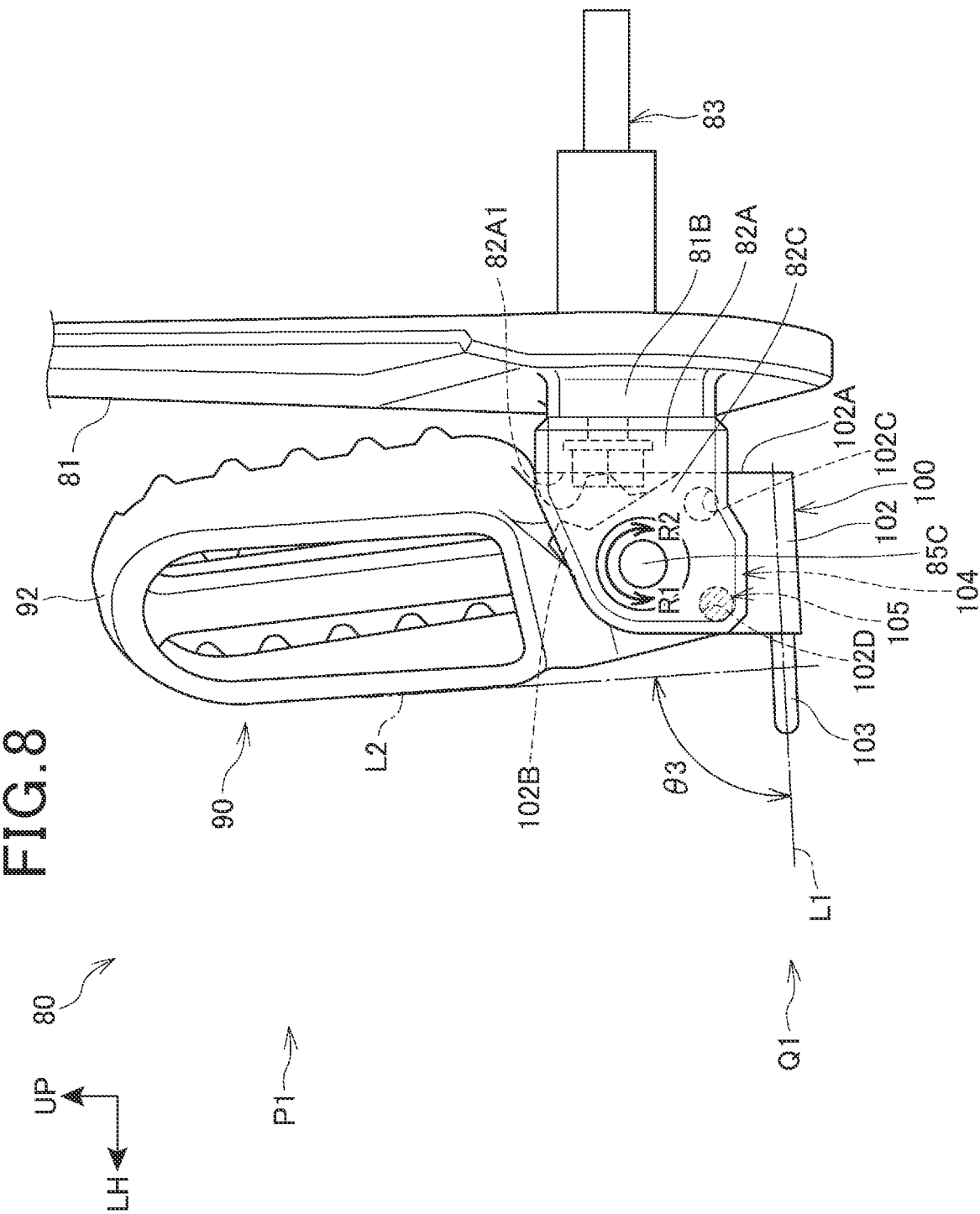
FIG. 8 is a diagram depicting a state in which the main step is moved to an accommodated position, and the first contact section of the click lever makes contact with the bracket.

FIG. 8 is a diagram depicting a state in which the main step 90 is moved to the accommodated position P2 and the first contact section 102A of the click lever 100 makes contact with the bracket 82 (FIG. 8 depicts a step accommodated state (a state in which the main step 90 is fixed at the accommodated position P2). In the step accommodated state, the click lever 100 engaging with the main step 90 is located at a biased rotation restriction position Q1, and the main step 90 is fixed at the accommodated position P2. In other words, a state in which the main step 90 is fixed at the accommodated position P2 is provided, unless the engagement between the main step 90 and the click lever 100 is released.).

The main step 90 is rotated around an axis of the step pin 85. The main step 90 is supported such as to be rotatable between the accommodated position P2 depicted in FIGS. 7 and 8 in which the main step 90 extends along an outer side surface of the step holder 81 and the developed position P1 depicted in FIG. 5 in which the main step 90 extends in the vehicle width direction intersecting the outer side surface of the step holder 81. The main step 90 is held in the developed position P1, with a contact section 91A (see FIG. 3) of the step base section 91 in contact with the bracket 82.

In the following description, the directions around the axis of the step pin 85 are the developing direction R1 and the accommodating direction R2. The developing direction R1 is the direction that the main step 90 rotates from the accommodated position P2 toward the developed position P1. The accommodating direction R2 is the direction that the main step 90 rotates from the developed position P1 toward the accommodated position P2.

As depicted in FIG. 4, a torsion spring-shaped return spring 95 as an example of a biasing member is supported on the step pin 85. The return spring 95 has a coil section 95A disposed between the front-side base section 93 and the rear-side base section 94 of the main step 90, and is disposed such as to be wound around the step pin 85. The return spring 95 has one end 95B bent, and hooked on the front-side base section 93 such as to press the main step 90 in the developing direction R1. In addition, the other end 95C of the return spring 95 is abutted on the bracket 82 such as to press the bracket 82 in the accommodating direction R2. The return spring 95 biases the main step 90 toward the developed position P1, and biases the main step 90 in the developing direction R1.

The click lever (operating member) 100 is rotatably supported on the step pin 85.

The click lever 100 includes a pair of front and rear plate-shaped rotational sections 101 and 102. The rotational sections 101 and 102 are formed individually with through-holes, in and through which the step pin 85 is inserted and passed. The rotational sections 101 and 102 are disposed on both front and rear sides of the step base section 91.

As depicted in FIGS. 5 and 7, a peripheral part of the rotational section 102 on the rear side is formed with a first contact section (contact section) 102A that makes contact with an inner wall surface 82A1 of a bottom plate section 82A of the bracket 82. The first contact section 102A includes a part longer than a minimum distance between a rotational center 85C and the bottom plate section 82A of the bracket 82, in a radial direction of the step pin 85. In the present embodiment, as illustrated in FIG. 5, the first contact section 102A extends rectilinearly along the inner wall surface 82A1 of the bracket 82. The first contact section 102A extends to a position below the bottom plate section 82A, making it easier to enlarge the area in which it can make contact with the inner wall surface 82A1 of the bottom plate section 82A.

An upper portion of the rotational section 102 on the rear side is formed with a second contact section (second contact section) 102B spaced from the inner wall surface 82A1 of the bottom plate section 82A, in a state in which the first contact section 102A makes contact with the inner wall surface 82A1 of the bottom plate section 82A. As depicted in FIG. 5 (rear view), the second contact section 102B is located in a counterclockwise direction (the downstream side in the developing direction R1) around the axis of the step pin 85, as compared to the first contact section 102A, in a state in which the first contact section 102A makes contact with the inner wall surface 82A1 of the bottom plate section 82A. The second contact section 102B makes contact with the inner wall surface 82A1 of the bottom plate section 82A, to restrict rotation in the accommodating direction R2. The second contact section 102B includes a part which is longer than the minimum distance between the rotational center 85C and the bottom plate section 82A of the bracket 82, in the radial direction of the step pin 85. In the present embodiment, as depicted in FIG. 6, the second contact section 102B is formed in a shape projecting in a radial direction from the rotational section 102.

The diameter of a peripheral part of the rotational section 102 is shorter than the distance between the rotational center 85C and the bottom plate section 82A of the bracket 82, between the first contact section 102A and the second contact section 102B. The click lever 100 is configured to be rotatable between a position (see FIG. 5) at which the first contact section 102A makes contact with the bracket 82 and a position (see FIG. 6) at which the second contact section 102B makes contact with the bracket 82.

Here, in the case where the click lever 100 is rotated in the developing direction R1 due to its own weight or by receiving a biasing force of the return spring 95, the click lever 100 is restricted in rotation in the developing direction R1 when the first contact section 102A makes contact with the bracket 82 (see FIG. 5). In view of this, in the following, the rotational position of the click lever 100 at which the first contact section 102A makes contact with the bracket 82 will be referred to as the biased rotation restriction position (rotation restriction position) Q1.

In addition, in the case where the click lever 100 is rotated in the accommodating direction R2 by an operating force of the driver or the like, rotation of the click lever 100 in the accommodating direction R2 is restricted when the second contact section 102B makes contact with the bracket 82 (see FIG. 6). In view of this, in the following, the rotational position of the click lever 100 at which the second contact section 102B makes contact with the bracket 82 will be referred to as an operation rotation restriction position (second rotation restriction position) Q2.

The rotation amount of rotation of the click lever 100 from the biased rotation restriction position Q1 to the operation rotation restriction position Q2 is smaller than the rotation amount of rotation of the main step 90 from the developed position P1 to the accommodated position P2.

The rotational section (first rotational section) 101 on the front side and the rotational section (second rotational section) 102 on the rear side are integrally joined by a bent rod-shaped lever main body section (extension section) 103. In the case where the click lever 100 has moved to the biased rotation restriction position Q1, the lever main body section 103 is in the state of projecting in the vehicle width direction from lower ends of the rotational sections 101 and 102, and projects in a direction orthogonal to the first contact section 102A. Specifically, the lever main body section 103 extends along a lower surface of the step main body section 92 having moved to the developed position P1, in rear view.

Figure 9:
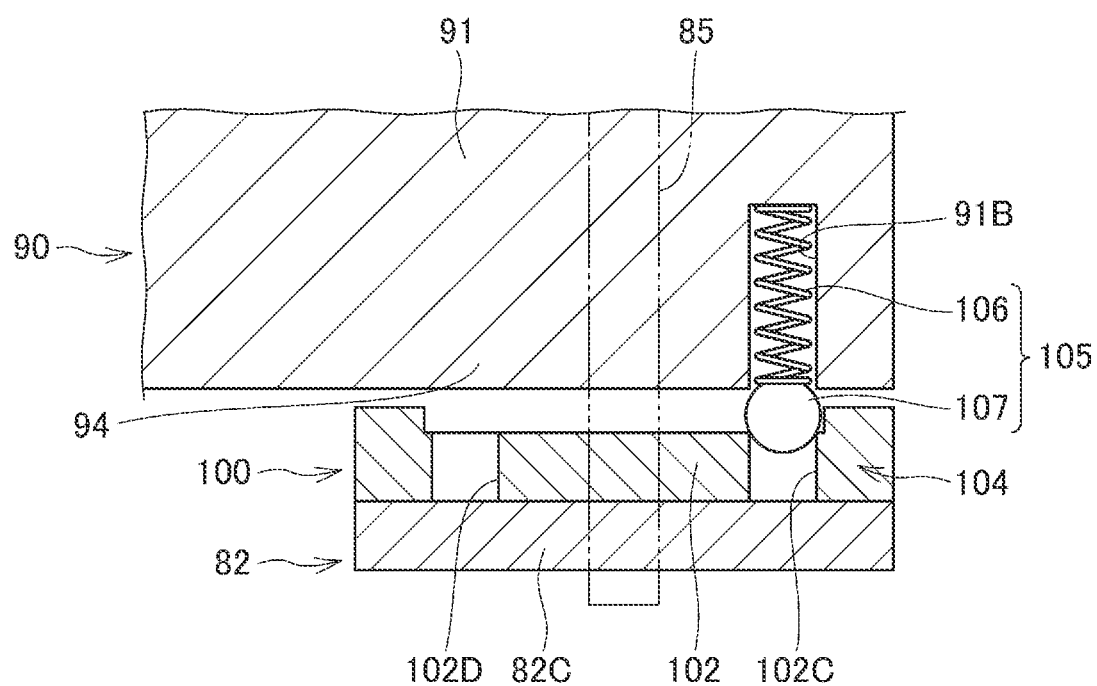
FIG. 9 is a schematic diagram corresponding to a section along line IX-IX of FIG. 5.

FIG. 9 is a schematic diagram corresponding to a section along line IX-IX of FIG. 5.

An engaging mechanism 104 is provided between the main step 90 and the click lever 100. The engaging mechanism 104 has a click ball (engaging member) 105. The click ball 105 is disposed between the rear-side base section 94 of the main step 90 and the rear-side rotational section 102 of the click lever 100. In the present embodiment, the click ball 105 is supported by the main step 90. Note that, in FIGS. 5 to 8, for convenience' sake, the click ball 105 is hatched.

A rear surface of the rear-side base section 94 is formed with a recess-shaped support hole 91B (see FIG. 9) that supports the click ball 105. The support hole 91B is recessed forward along a longitudinal direction of the step pin 85. In rear view depicted in FIG. 5, the support hole 91B in the present embodiment is formed on a lower side of a vehicle width directionally inner side of the step pin 85.

A compression spring 106 as an example of a biasing section is inserted in the support hole 91B. A steel ball 107 as an example of an engaging/disengaging member is disposed at a rear end (one end) of the compression spring 106. The steel ball 107 is biased rearward by the compression spring 106. The disposing position of the click ball 105 at the rear-side base section 94 is overlapping with the click lever 100 as viewed in an axis of the step pin 85 depicted in FIGS. 5 to 8. The click ball 105 is biased toward a front surface (inner wall) of the rear-side rotational section 102 of the click lever 100.

The compression spring 106 and the steel ball 107 constitute the click ball (engaging member) 105 in the present embodiment. The click ball 105 is rotated integrally with the main step 90 around an axis of the step pin 85.

The rear-side rotational section 102 of the click lever 100 is formed with a developing engaging hole (second engaging section) 102C and an accommodating engaging hole (engaging section) 102D in and from which the click ball 105 can be engaged and disengaged. The developing engaging hole 102C and the accommodating engaging hole 102D are formed in the shape of round holes penetrating in the front-rear direction (thickness direction).

The developing engaging hole 102C and the accommodating engaging hole 102D are formed on a rotational locus drawn by the click ball 105 moved together with the main step 90, in the case where the click lever 100 and the main step 90 are rotated relative to each other. The developing engaging hole 102C and the accommodating engaging hole 102D are formed with a predetermined spacing therebetween in the circumferential direction of the step pin 85.

In the present embodiment, the developing engaging hole 102C is formed at a position for engagement with the click ball 105, in the case where the click lever 100 is moved to the biased rotation restriction position Q1 and the main step 90 is moved to the developed position P1. In other words, the developing engaging hole 102C is formed at a position for engagement with the click ball 105 in a state in which the spacing (gap) between an extension direction L2 of the bottom surface of the main step 90 and an extension direction L1 of the lever main body section 103 of the click lever 100 becomes a predetermined relative angle (relative rotational angle) θ1, in the case where the developing engaging hole 102C is engaged with the main step 90 through the click ball 105.

On the other hand, in the present embodiment, the accommodating engaging hole 102D is formed at a position for engagement with the click ball 105, in the case where the main step 90 is moved to the accommodated position P2 and the click lever 100 is moved to the biased rotation restriction position Q1. In other words, the accommodating engaging hole 102D is formed at a position for engagement with the click ball 105, in a state in which the spacing (gap) between the extension direction L2 of the main step 90 and the extension direction L1 of the lever main body section 103 becomes a predetermined relative angle θ3. The relative angle θ3 is greater than the relative angle θ1.

The developing engaging hole 102C and the accommodating engaging hole 102D are formed such that, when the steel ball 107 of the click ball 105 enters therein and is engaged therewith, the click lever 100 and the main step 90 are engaged and integrated with each other. Therefore, the click lever 100 and the main step 90 can integrally be rotated and can integrally be stopped in rotation.

In addition, when the steel ball 107 of the click ball 105 is retracted from the developing engaging hole 102C or the accommodating engaging hole 102D, the click lever 100 and the main step 90 can be rotated relative to each other.

Therefore, the main step 90 and the click lever 100 are engaged and integrated with each other in the case where the spacing between the extension direction L2 of the main step 90 and the extension direction L1 of the click lever 100 is the relative angle θ1 or θ3, by the click ball 105, the developing engaging hole 102C, and the accommodating engaging hole 102D, and are rotatable relative to each other in the case where the spacing between the extension direction L2 of the main step 90 and the extension direction L1 of the click lever 100 is not the relative angle θ1 or θ3. Note that a relative angle θ2 depicted in FIG. 7 is greater than the relative angle θ1 but smaller than the relative angle θ3.

In the present embodiment, the engaging section is described as the configuration of a hole-shaped engaging hole penetrating in the thickness direction, but the engaging section may be in the shape of a rearwardly recessed groove, instead of the hole shape.

The engaging mechanism 104 in the present embodiment includes the click ball 105, the developing engaging hole 102C, and the accommodating engaging hole 102D.

Next, an operation of the main step structure 80 in the present embodiment will be described.

As illustrated in FIG. 5, the main step 90 is held in the developed position P1 with the contact section 91A in contact with the bracket 82 (the inner wall surface 82A1 of the bottom plate section 82A). In this instance, the click ball 105 is engaged in the developing engaging hole 102C, and the main step 90 and the click lever 100 are integrated with each other. Therefore, at the developed position P1, the main step 90 is restricted in rotation in the developing direction R1 by the click lever 100, but is permitted to rotate in the accommodating direction R2.

In this state, for example, in the case where the driver performs an operation for moving the tip of the main step 90 upward, the main step 90 is rotated in the accommodating direction R2 toward the accommodated position P2. In this instance, the click lever 100 is engaged with the main step 90 by the developing engaging hole 102C and the click ball 105, and, therefore, the click lever 100 is rotated while the state of the relative angle θ1 is maintained. Then, when the second contact section 102B of the click lever 100 makes contact with the bracket 82, rotation of the click lever 100 in the accommodating direction R2 is restricted, and rotation of the main step 90 is also restricted in the state of the relative angle θ1.

In this instance, when a force for rotating the main step 90 further in the accommodating direction R2 is exerted, the click ball 105 is disengaged from the developing engaging hole 102C to enter a disengaged state, and the main step 90 and the click lever 100 become rotatable relative to each other. Therefore, as depicted in FIG. 7, the click ball 105 is moved to a position between the developing engaging hole 102C and the accommodating engaging hole 102D, and the main step 90 is moved to the accommodated position P2.

When an operating force is no longer exerted on the main step 90 due to taking a hand off the main step 90, in a state in which the main step 90 is moved to the accommodated position P2 (in a state in which the main step 90 and the click lever 100 are disengaged from each other), a biasing force of the return spring 95 causes the main step 90 to rotate in the developing direction R1 and to move toward the developed position P1.

In this instance, the click ball 105 is also moved toward the developed position P1, and, in the case where the spacing between the main step 90 and the click lever 100 becomes the relative angle θ1, the click ball 105 is engaged with the developing engaging hole 102C of the click lever 100. Therefore, the click lever 100 returns to the state of being engaged with the main step 90 when moving to the biased rotation restriction position Q1.

On the other hand, when the click lever 100 is operated in the developing direction R1 and rotated to the biased rotation restriction position Q1 in a state in which the main step 90 is held in the accommodated position P2, the accommodating engaging hole 102D of the click lever 100 relatively approaches the position of the click ball 105, to engage with the click ball 105, as depicted in FIG. 8. Therefore, the main step 90 and the click lever 100 are engaged with each other, and, accordingly, the main step 90 is held in the accommodated position P2 in the state of resisting against the biasing force of the return spring 95, by the click lever 100 moved to the biased rotation restriction position Q1.

Thus, in the present embodiment, in the case where the main step 90 is held in the accommodated position P2, it is necessary for the driver or the like to operate the click lever 100. Therefore, the driver or the like must operate consciously, as compared to the case of a configuration in which the main step 90 can be held in an accommodated state by operating only the main step 90, making it easier to permit the driver or the like to recognize that the main step 90 has been moved to the accommodated position P2. In addition, the main step 90 is not held in the accommodated position P2 by only a load in the accommodating direction R2 due to a disturbance (contact of the main step 90 with the road surface, or the like), and, unless the click lever 100 is operated consciously, a returning function acts as in the case of an ordinary main step, and the main step 90 is returned to the developed position P1.

Particularly, in the present embodiment, when the main step 90 is moved from the developed position P1 to the accommodated position P2, the click lever 100 is disengaged from the main step 90. Then, when the click lever 100 is disengaged from the main step 90, the spacing between the click lever 100 and the main step 90 changes from the relative angle θ1 to a relative angle θ2 greater than the relative angle θ1. Therefore, it is easy to put a hand or the like between the main step 90 and the lever main body section 103 of the click lever 100, and it is easy to rotate the click lever 100 toward the biased rotation restriction position Q1.

In the present embodiment, with the main step 90 rotated in the accommodating direction R2, relative to the click lever 100 moved to the operation rotation restriction position Q2, the engagement between the main step 90 and the click lever 100 is released. In other words, by operating the main step 90 longer than the click lever 100, it can be made easy to disengage the main step 90 and the click lever 100 by utilizing the principle of leverage. Note that, since there is a difference between the rotation amount of the main step 90 and the rotation amount of the click lever 100, an operation of disengaging the main step 90 and the click lever 100 can be facilitated.

In addition, since the spacing between the click lever 100 and the main step 90 is enlarged by moving the main step 90 to the accommodated position P2, it becomes easy to put a hand or the like between the main step 90 and the lever main body section 103 of the click lever 100, and it is easy to press down and rotate the click lever 100 toward the biased rotation restriction position Q1.

Therefore, in the case of holding the main step 90 at the accommodated position P2, the main step 90 can consciously be held at the accommodated position P2, by operating the two members of the main step 90 and the click lever 100.

In the present embodiment, in the case of developing the main step 90 held in the accommodated position P2, for example, a sufficient force is exerted on the tip of the main step 90 in the developing direction R1, whereby the click ball 105 is disengaged from the developing engaging hole 102C. As a result, the main step 90 and the click lever 100 become rotatable relative to each other, and the main step 90 is moved to the developed position P1 by a biasing force of the return spring 95. In addition, in this instance, the click ball 105 is engaged with the developing engaging hole 102C, and the main step 90 and the click lever 100 return to the engaged state.

Besides, the main stand 51 and the side stand 52 are disposed on lower sides of the main steps 90.

In a state in which the main steps 90 are moved to the developed positions P1, it may be difficult to operate the main stand 51 and the side stand 52.

On the other hand, in the present embodiment, by operating the click lever 100, the main step 90 can be held in the accommodated position P2. In the case of not using the main step 90, therefore, it can be made easy to operate the main stand 51 and the side stand 52 by consciously accommodating the main step 90.

Here, the two-wheeled motor vehicle 1 of the present embodiment includes the step floors 50 on a front lower side of the seat 13, and, in normal traveling, the driver can put his or her feet on the step floors 50, and can travel with the main steps 90 in the accommodated state when not using the main steps 90. On the other hand, in the case where it is desired to travel with the feet put on the main steps 90 in place of the step floors 50, in a specified state such as rough-road traveling, the main steps 90 can be used by being developed from the accommodated state. Particularly, in the case of assuming a situation of standing riding, the main steps 90 can be used.

In addition, the main steps 90 in the present embodiment are biased to the developed positions P1 by the return springs 95, and the main steps 90 are developed unless consciously accommodated, and, therefore, the main steps 90 can be used according to the driver's (user's) need. In other words, the driver (user) who does not use the main steps 90 on a daily basis can travel with the main steps 90 accommodated, and can use the main steps 90 by developing them in the case where he or she needs the main steps 90. In addition, the driver (user) who uses the main steps 90 normally can use the main steps 90 with flexibility such as normally developing the main steps 90 and accommodating them when not needing.

As described above, according to the present embodiment to which the present invention is applied, in the main step structure for a saddle riding vehicle, including the bracket 82 fixed to the vehicle body, the step pin 85 supported by the bracket 82, the main step 90 rotatably supported by the step pin 85, and the return spring 95 biasing the main step 90 in the developing direction R1 around an axis of the step pin 85 toward the developed position P1, the click lever 100 rotatably supported by the step pin 85 and supported rotatably relative to the main step 90 is provided, the click lever 100 is provided with the first contact section 102A that makes contact with the bracket 82 to rotate the bracket 82 in the developing direction R1, the engaging mechanism 104 that can switch between the engaged state and the disengaged state of the main step 90 and the click lever 100 is provided between the main step 90 and the click lever 100, and the engaging mechanism 104 puts the main step 90 and the click lever 100 into the engaged state in the case where the click lever 100 is moved to the biased rotation restriction position Q1 where the first contact section 102A makes contact with the bracket 82, in a state in which the main step 90 is moved to the accommodated position P2. Therefore, by operating the click lever 100 to engage the click lever 100 with the main step 90, the main step 90 biased to the developed position P1 can be held in the accommodated position P2. For this reason, in the case of holding the main step 90, an operation of the click lever 100 is needed, and the main step 90 can consciously be held in the accommodated position P2.

In the present embodiment, the engaging mechanism 104 includes the click ball 105, and the accommodating engaging hole 102D in and from which the click ball 105 is engaged and disengaged, the click ball 105 includes the steel ball 107 engaged in and disengaged from the accommodating engaging hole 102D, and the compression spring 106 biasing the steel ball 107 to the accommodating engaging hole 102D, and the accommodating engaging hole 102D is an engaging hole (engaging groove) into which the steel ball 107 enters in an engageable and disengageable manner. Therefore, the main step 90 and the click lever 100 can be engaged with and disengaged from each other, according to a rotating operation of the click lever 100, with a simple configuration.

In addition, in the present embodiment, the main step 90 includes the step main body section 92, and the step base section 91 extending from the step main body section 92 and rotatably supported by the step pin 85, the step base section 91 has the rear-side base section 94 overlapping with the click lever 100 as viewed in an axis of the step pin 85, the click ball 105 is disposed at the rear-side base section 94, and the click lever 100 is provided with the accommodating engaging hole 102D on a rotational locus of the click ball 105. Therefore, the click ball 105 is securely abutted on the click lever 100 at the time of relative rotation of the main step 90 and the click lever 100, so that it is easy to securely engage and disengage the click ball 105 and the accommodating engaging hole 102D.

Besides, in the present embodiment, the click lever 100 is provided with the developing engaging hole 102C in and from which the click ball 105 is engaged and disengaged, on a downstream side of the developing direction R1 relative to the accommodating engaging hole 102D and on a rotational locus of the click ball 105, and the developing engaging hole 102C is engaged with the click ball 105 in a state in which the main step 90 is moved to the developed position P1 and the click lever 100 is moved to the biased rotation restriction position Q1. Therefore, when the main step 90 is moved to the developed position P1, the main step 90 and the click lever 100 can be engaged with each other. In addition, since the main step 90 having moved to the developed position P1 is engaged with the click lever 100, in the case where the main step 90 is moved from the developed position P1 toward the accommodated position P2, the click lever 100 can also be moved integrally with the main step 90.

Besides, in the present embodiment, the click lever 100 is provided with the second contact section 102B that is provided on the downstream side of the developing direction R1 relative to the first contact section 102A and makes contact with the bracket 82 to restrict rotation of the bracket 82 in the accommodating direction R2 opposite to the developing direction R1, the click lever 100 can be rotated between the biased rotation restriction position Q1 and the operation rotation restriction position Q2 where the second contact section 102B makes contact with the bracket 82, and the developing engaging hole 102C is disengaged from the main step 90 in the case where the main step 90 is moved to the accommodated position P2 in a state in which the click lever 100 is moved to the second rotation restriction position Q2. Therefore, in the case where the click lever 100 is moved to the second rotation restriction position Q2 in a state in which the main step 90 and the click lever 100 are engaged with each other, the engagement between the click lever 100 and the main step 90 can be released, by moving the main step 90 further in the accommodating direction R2. For this reason, the engagement of the click lever 100 and the main step 90 can be released, by a simple operation of rotating the main step 90 from the developed position P1 to the accommodated position P2.

In addition, in the present embodiment, the click lever 100 is provided with the lever main body section 103 extending along a lower surface of the main step 90. Therefore, in the case where the main step 90 is engaged with the click lever 100 at the developed position P1, the lever main body section 103 extends along the main step 90, and, in the case where the engagement is released in the course of movement of the main step 90 from the developed position P1 to the accommodated position P2, the spacing between the lever main body section 103 and the main step 90 is enlarged, so that it is easy to operate the lever main body section 103 and to operate the click lever 100.

Besides, in the present embodiment, the main step 90 is disposed between the step floor 50 provided on a front lower side of the seat 13 and the main stand 51 and the side stand 52 provided on a lower side of the seat 13, in vehicle side view. Therefore, an operation of the main stand 51 and the side stand 52 is facilitated by holding the main step 90 at the accommodated position P2. In addition, the driver can put his or her feet on the step floor 50 even if the main step 90 is held in the accommodated position P2.

Note that the above embodiment describes a mode of application of the present invention, and the present invention is not limited to the above embodiment.

While a configuration in which the click ball 105 as an engaging member is supported by the main step 90 and the click lever 100 is formed with the developing engaging hole 102C and the accommodating engaging hole 102D has been described in the above embodiment, a configuration in which the developing engaging hole 102C and the accommodating engaging hole 102D are formed in the main step 90 and the click lever 100 is supported by the click ball 105 may be adopted. Note that, in this case, the click ball 105 corresponds to an engaging section.

In addition, while a configuration of the click ball 105 as an example of an engaging member has been described in the above embodiment, it is sufficient that the main step 90 and the click lever 100 can integrally be engaged with each other against a biasing force of the return spring 95. Therefore, while a configuration of using the compression spring 106 as a biasing member for engagement has been exemplified, for example, a hydraulic pressure may be adopted. Besides, as an engaging member, for example, a projection may be adopted.

In addition, while a configuration in which the first contact section 102A and the second contact section 102B are provided in the rear-side rotational section 102 has been described in the above embodiment, the contact sections may be provided in the front-side rotational section 101, instead of the rear-side rotational section 102, or may be provided in both the front and rear rotational sections 101 and 102.

Besides, while a configuration in which the engaging mechanism 104 is provided between the main step 90 and the click lever 100 and the engaging mechanism 104 is provided between the step base section 91 of the main step 90 and the rear-side rotational section 102 has been described in the above embodiment, the engaging mechanism 104 may be provided between the step base section 91 and the front-side rotational section 101, instead of between the step base section 91 and the rear-side rotational section 102. In addition, the engaging mechanism 104 may be provided both between the step base section 91 and the front-side rotational section 101 and between the step base section 91 and the rear-side rotational section 102.

Although, in the embodiment described above, the saddle riding vehicle is described taking the two-wheeled motor vehicle 1 as an example, the present invention is not restricted to this and can be applied to a three-wheeled saddle riding vehicle that includes two front wheels or two rear wheels and a saddle riding vehicle in which four wheels or more are provided.

DESCRIPTION OF REFERENCE SYMBOLS

13: Seat
50: Step floor
51: Main stand (stand)
52: Side stand (stand)
82: Bracket (fixing member)
85: Step pin
90: Main step
94: Rear-side base section (overlapping part)
95: Return spring (biasing member)
100: Click lever (operating member)
102A: First contact section (contact section)
102B: Second contact section (second contact section)
102C: Developing engaging hole (second engaging section)
102D: Accommodating engaging hole (engaging section)
103: Lever main body section (extension section)
104: Engaging mechanism
105: Click ball (engaging member)
106: Compression spring (biasing section)
107: Steel ball (engaging/disengaging member)

P1: Developed position
P2: Accommodated position
Q1: Biased rotation restriction position (rotation restriction position)
Q2: Operation rotation restriction position (second rotation restriction position)
R1: Developing direction
R2: Accommodating direction

The invention claimed is:

1. A main step structure for a saddle riding vehicle, including a fixing member fixed to a vehicle body, a step pin supported by the fixing member, a main step rotatably supported by the step pin, and a biasing member that biases the main step in a developing direction around an axis of the step pin toward a developed position,
wherein an operating member that is rotatably supported by the step pin and is supported such as to be rotatable relative to the main step is provided,
the operating member is provided with a contact section that makes contact with the fixing member to restrict the fixing member from rotating in the developing direction,
an engaging mechanism that is able to switch between an engaged state and a disengaged state of the main step and the operating member is provided between the main step and the operating member, and,
in a state in which the main step is moved to an accommodated position, in a case where the operating member is moved to a rotation restriction position where the contact section makes contact with the fixing member, the engaging mechanism puts the main step and the operating member in an engaged state.

2. The main step structure for the saddle riding vehicle according to claim 1,
wherein the engaging mechanism includes an engaging member and an engaging section that engages with and disengages from the engaging member,
the engaging member includes an engaging/disengaging member that engages with and disengages from the engaging section, and a biasing section that biases the engaging/disengaging member to the engaging section, and
the engaging section is an engaging groove into which the engaging/disengaging member enters in an engageable and disengageable manner.

3. The main step structure for the saddle riding vehicle according to claim 2,
wherein the main step includes a step main body section, and a step base section that extends from the step main body section and is rotatably supported by the step pin,
the step base section has an overlapping part that overlaps with the operating member as viewed in an axis of the step pin,
the engaging member is disposed at the overlapping part, and
the operating member is provided with the engaging section on a rotational locus of the engaging member.

4. The main step structure for the saddle riding vehicle according to claim 3,
wherein the operating member is provided with a second engaging section for engagement with and disengagement from the engaging member, on a further downstream side in the developing direction than the engaging section and on a rotational locus of the engaging member, and
the second engaging section is engaged with the engaging member in a state in which the main step is moved to the developed position and the operating member is moved to the rotation restriction position.

5. The main step structure for the saddle riding vehicle according to claim 4,
wherein the operating member is provided with a second contact section that is provided on a further downstream side in the developing direction than the contact section and makes contact with the fixing member to restrict rotation of the fixing member in an accommodating direction opposite to the developing direction,
the operating member is capable of being rotated between the rotation restriction position and a second rotation restriction position where the second contact section makes contact with the fixing member, and
the second engaging section is disengaged from the main step in a case where the main step is moved to the accommodated position in a state in which the operating member is moved to the second rotation restriction position.

6. The main step structure for the saddle riding vehicle according to claim 5,
wherein the operating member is provided with an extension section extending along a lower surface of the main step.

7. The main step structure for the saddle riding vehicle according to claim 1,
wherein the main step is disposed between a step floor provided on a front lower side of a seat and a stand provided on a lower side of the seat in vehicle side view.

* * * * *